United States Patent

Isherwood

[11] Patent Number: 5,918,219
[45] Date of Patent: *Jun. 29, 1999

[54] SYSTEM AND METHOD FOR ESTIMATING CONSTRUCTION PROJECT COSTS AND SCHEDULES BASED ON HISTORICAL DATA

[76] Inventor: John Philip Isherwood, 105 Stephan Rd., Aptos, Calif. 95003

[ * ] Notice: This patent issued on a continued prosecution application filed under 37 CFR 1.53(d), and is subject to the twenty year patent term provisions of 35 U.S.C. 154(a)(2).

[21] Appl. No.: 08/357,417

[22] Filed: Dec. 14, 1994

[51] Int. Cl.⁶ ..................................................... G06F 17/60
[52] U.S. Cl. .................................. 705/37; 705/9; 705/10; 705/20; 235/378
[58] Field of Search .................................. 395/209; 705/9, 705/10, 20, 37; 235/378

[56] References Cited

U.S. PATENT DOCUMENTS

| | | | |
|---|---|---|---|
| 3,846,702 | 11/1974 | Dziki et al. | 324/186 |
| 4,019,027 | 4/1977 | Kelley | 235/89 |
| 4,578,768 | 3/1986 | Racine | 364/560 |
| 4,700,318 | 10/1987 | Ockman . | |
| 4,782,448 | 11/1988 | Milstein | 364/464.01 |
| 4,852,001 | 7/1989 | Tsushima et al. | 364/401 |
| 4,989,141 | 1/1991 | Lyons et al. | 364/408 |
| 5,111,391 | 5/1992 | Fields et al. | 364/401 |
| 5,146,548 | 9/1992 | Bijnagte . | |
| 5,189,606 | 2/1993 | Burns et al. . | |
| 5,216,593 | 6/1993 | Dietrich et al. | 364/402 |
| 5,233,533 | 8/1993 | Edstrom et al. | 364/468 |
| 5,235,680 | 8/1993 | Bijnagte . | |
| 5,270,920 | 12/1993 | Pearse et al. | 364/401 |
| 5,276,805 | 1/1994 | Hamaguchi . | |

OTHER PUBLICATIONS

Baker, S., Mendel, T.; "Applications of Computers to Project"; TAPPI Proceedings ISSN 0272–7269; pp. 335–341, 1985.

Hatwell, R.; "Cost Engineering System for the Future"; Cost Engineering; V35, N3, pp. 13–17; Mar., 1993.

Kevin McManus, "Picturing a City's Rise: Stewart Brothers Photographers Records Development", The Washington Post, v 114, n 348, sec E, p. 1, Nov. 18, 1991.

*Primary Examiner*—Emanuel Todd Voeltz
*Assistant Examiner*—William N. Hughet
*Attorney, Agent, or Firm*—Gary S. Williams; Flehr Hohbach Test Albritton & Herbert LLP

[57] ABSTRACT

A distinctive estimating method using a concise depiction, organization, and presentation of time, related to the number of items accomplished, to produce a Historical Data Block of information, that is a stable inference base. These Blocks of information can be stored, referenced, anatomized, multiplied or divided and restacked, to create other accurate totals and estimates. This stable Block easily allows the accurate calculation of future duration times and item quantity totals. The calculated item quantities can be used to calculate current item costs and totals, by using a current item cost database. Or the item totals can be printed and sent out, requesting a quote, or sent out as purchase orders. The accurate duration times can be used to automatically produce a schedule, concurrently with the estimate, by using a predefined templet. These duration times can also be used to calculate accurate: duration costs, employee goals for profit sharing, payroll, and insurance premiums, all of which increase the efficiency of management and the estimating processes.

18 Claims, 6 Drawing Sheets

SYSTEM AND METHOD FOR ESTIMATING CONSTRUCTION PROJECT COSTS AND SCHEDULES BASED ON HISTORICAL DATA

FIELD OF THE INVENTION

This invention relates to information management, to improve the flow of a project, with the simplicity and reliability of estimating time, scheduling, and costs, which are essential in all types of industry, especially in construction.

BACKGROUND—DISCUSSION OF PRIOR ART

With many technological advances in construction, the industry has experienced a virtual explosion of cost overruns and claims totaling in the billions of dollars. This is due to the fact the common methods used to estimate the average construction project today is: 1) With generic information supplied by an outside source, in cost data manuals or on digital computer media. 2) In insubstantial experience records mainly geared for job costing controls, with neither one conveying lucid and relevant estimating insight to the events. The outside data sources are popular because of the diversity of items covered, and they are organized to get to the total dollar amount, as fast as possible. Their convenience tends to diminish the significance of historical record keeping. Experience records are the best guide but, time fades memories and paper records are cumbersome to maintain and search. Paper and pen have been supplemented with computerized spreadsheets or database assembly programs, attempting to simplify the itemizing and calculations required. Most software companies attempt to organizing and present relevant estimating data but they fail. They fail to provide a simple solid basis for judgment. They fail to organize in a simple format the detailed knowledge needed to produce a distinct, competitive bid, or fine tuned schedule. Human knowledge and judgment are the basic ingredients in all estimating methods. Applying knowledge correctly requires details to support judgments, and the judgments determine the accuracy of the results.

First of all, the prices and duration times supplied by a 3rd party source are based on certain variables, conditions, and details not experienced or known by the average estimator. This minimal knowledge, when used incorrectly, can cause devastating errors in timing and pricing. Additionally, the data manuals require an up-front, clear definition of every aspect of the project including size, power, heating, cooling, type of construction, special construction needs, unique problems, site location, and the anticipation of unknown areas of risk during the project. This detail generates vast uncertainties and potential omissions in the estimating process because the estimate is not based on the estimator's own direct knowledge or detailed records. If for example, estimators from separate companies were all given the same 3rd party faulty data to bid on the same job, their bids would all be very close because they used the same 3rd party data, but not accurate or truly competitive.

The Quantity Take Off (QTO) method has been traditionally used to identify and estimate detailed work. It involves, for example, counting every two-by-four stud required for each wall as well as the number and size of the nails that will be used to secure each stud. Unit Cost (UC) estimating manuals supply the estimator with a total cost per definable unit, e.g. lineal foot, that can be quickly multiplied to determine the cost of the task, with a minimal description of details. The computer has allowed QTO and UC to take a step further, by grouping items into assemblies. Instead of counting all the studs and nails required to construct a wall, the assembly has defined all the material items needed to construct a unit. The units can then be duplicated or divided by the number of units needed e.g. a 10 foot long wall would use 10 units to calculate the material necessary to construct the wall. The power of an assembly can be seen from nested assemblies, or sub assemblies. For example, a bathroom could be the primary assembly, made up with the sub assemblies of, framing, fixtures, and finishes. By choosing a bathroom unit, all the sub assembly items and calculations are selected also. To keep up with changes in costs of these units, the manual and software vendors periodically supply local area modification indexes, or cost adjustment factors. These assembly units have streamlined the construction cost estimating process. But the accuracy of the cost/time necessary to complete the tasks are the media publisher's total responsibility. The records and knowledge of the actual work are unobtainable. A work crew may be slower but cost less, or faster and cost less than the generic information supplied by the 3rd parties. If the estimator wants to "tighten up" the estimate, to make the bid more competitive, they must scrutinize their records for some basis or they must take an unsupported judgment risk.

Job Cost accounting and Estimating have been separate disciplines. Job Costing computer programs produce job cost totals useful for controlling the job under construction by the amount of money expended on each phase or milestone. As a byproduct, the Job Cost system also tracks man hours expended by milestone to monitor their cost. Man hours is available to the estimator in job cost milestone reports, in the job cost program. Some software products have partially merged the two disciplines to make available the total cost of a milestone in the estimating system, but costs change so quickly they cannot be relied upon as a stable guide for future biding, only ballpark estimating. Job cost units are inherently unstable because of changes in the costs of the components that make up the unit, e.g. material, taxes, overhead, inflation, labor. All of these costs can change within weeks. Therefore, any knowledge gain from the historical cost information is unstable also. A task completed many years ago will still take the same amount of time to complete today, but it will not cost the same because of all the associated volatile variables that are lumped together. A portion of the information gathered can be stable for many years. That information is: items and man hours, but they may or may not be apparently correlated to each other, to make the history of them useful in the future. In essence, man hours and items, have not been properly refined or filtered from the raw material, specifically for the estimator.

To prepare a schedule the estimator must be able to answer the question: "How long will these tasks take?" Duration misjudgments are one of the greatest risks, if not the greatest risk, in the construction industry. The skill of estimating the duration times comes from the estimator's judgment, coupled with his ability to root out the correct man hours from the 3rd. party information or job cost history reports. The more detailed records and direct knowledge the estimator has of the task, the greater the accuracy of the estimate. Correctly judging the duration times from 3rd. party information, or vague detached reports is: tedious, time consuming, error prone, and closer to an art form, than a disciplined science. Once the estimator has determined the amount of time needed to complete the tasks they must construct a schedule for the job, placing the tasks in the correct sequence with network links to the other tasks.

Estimates, schedules, or projects, produced using the methods just described, clearly lack a high degree of efficiency and reliability, because the estimator is lacking the intimate detailed knowledge and definite records to quickly, simply and accurately derive the duration times coupled to materials. The raw data is available to the estimator, but the time required to input, extract, and format the information to set up a new job, and then run that job, makes the information unavailing. It is so much work to get anything useful out of the data, that the risk/reward ratio favors the risk.

An analogy for running a business this way would be: having only a paddle to steer a boat with a storm looming on the horizon. Whether a storm hits or not, it takes a lot of work to stay the course. To continue the analogy my invention takes the industry from paddles to a rudder with power steering. By defining a stable base, building from that point creates a guide to steer the entire object quickly, simply and accurately. That pivotal point is: a Block of information: encapsulated, and communicated knowledge. Simply, modular information that can be easily: collected, stored, identified, transferred, anatomized, multiplied or divided. These knowledge Blocks produces a stable judgment base, from specifically aligned modular information.

United States patents of interest include: U.S. Pat. No. 4,700,318, Ockman graphically depicts structures, or elements of structures, by shading or coloring them to show the portions of the project that are completed, ahead, or behind, schedule. U.S. Pat. No. 4,782,448, Milstein uses a computer with a digitizing ruler as an aid in contract estimating. He is concerned with the building construction trades where there is the necessity to provide accurate estimates of the cost of constructions for use in competitive bidding. In estimating, he takes into account the costs of a vast multitude of structural, plumbing, electrical, heating and other types of purchased equipment and components. Racine in U.S. Pat. No. 4,578,768 describes a computer aided system used in construction, planning, land survey, real estate and many other industries. Burns in U.S. Pat. No. 5,189,606 describes a totally integrated construction cost estimating, analysis, and reporting system that focus on estimating the complete life cycle cost of facilities such as airfields or facilities associated with major weapons programs. Tsushima in U.S. Pat. No. 4,852,001 describes a job scheduling method for resource leveling, or workload balancing.

SUMMARY OF THE INVENTION

It is therefore an object of the invention to provide a rudder for autonomous managerial steering. An improved system for industry with the means to simplify the management process. Easily supplying the estimator with accurate, detailed, refined, meaningful information to analyze as the primary data source, to quickly, simply and accurately produce a truly distinctive competitive bid, and fine tuned schedule. With 3rd party estimating data needed only as back up information.

It is a further object of this invention to provide such a system and method that detailed information shall be linked together conveying knowledge, using historically retrieved blocks of data (historical data blocks) that are independent of any one project.

It is a further object of this invention to provide such a system and method that duration times can be captured and recorded specifically for reference in future estimating, and scheduling.

It is a further object of this invention to provide such a system and method that the detailed information shall include the total items/units placed, by using Blocks of such data to calculate future quantity totals and costs.

It is a further object of this invention to provide such a system and method that with accurate duration times, to produce a schedule automatically and in conjunction with the estimate.

It is a further object of this invention to provide such a system and method that with accurate duration times, goals can be set for employees to beat, for profit sharing, and greatly improving efficiency.

It is a further object of this invention to provide such a system and method that will merge the information of estimating, job costing, scheduling, specifications detailing.

The invention results from the realization that a truly accurate, reliable and automated estimating technique can be effected by capturing independent focused Blocks of data intimately linked to all associated parts of a task. Man hours and materials collected and recorded in these focused Blocks can be reorganized and restacked to accurately project the course of a future job. There are many ways to identify the actual hours spent on a job. The estimator could have the computer system prepare tickets per task to be allocated to the employees as time cards. The employees could take a ticket to do a task entering the time on the ticket only when the task was completed, to produce payroll and the task times. The supervisor on the job could specifically assign resources to a job and record the total as the job is completed. The critical link is that actual man hours must be accurate and directly linked to a defined quantity of material items and units, producing an extremely accurate intrinsic historical record of that event, a focused Building Block. These data Blocks can then be entered into the computer database with cross referenced names, ready to be restacked in different orders, divided, or multiplied as necessary to fill the units required for the next similar job.

One object adding much utility to the defined Block is a stored photograph or image of the completed task and information including the "hours per unit" it took to complete the task. The stored image preferably depicts actual details involved in the work directly linked to the items and the amount of time required to complete the work. This picture could be a photograph of the work, to be scanned into digital form later, or produced by a video or still digital camera, or other actual illustrative means, preferably at the job site. The next time a similar job needs to be estimated, this picture will aid the judgment of the estimator in choosing which job is closest to the job he is estimating now. This picture will represent a Building Block of data and must have a direct link to the total man hours spent and the total units placed plus any stand by time. Man hours then can be divided by the number of actual units placed plus any standby time to obtain an accurate unit duration.

Another object aiding the estimating process is a direct link to the actual job material list details. The total number of materials used can be divided into the totals units placed, to produce a material item count per unit for the next estimate. When the next estimate for a defined unit is needed, purchase orders can be easily detailed and calculated with the total materials necessary to complete the specified number of units.

Another object, scheduling is simultaneously taken care of during the estimating process. As the estimator measures the plans, selects the closest Block and totals the number of units required for the current job, the duration times are also proportionally adjusted. The proportioned duration times can automatically be transferred into a pre defined master interdependent network scheduling templet, or map. The estimator may intervene and manually adjust the total or placement on the network prior to dispatch to the map. A finite example of the beginning of a master templet for a house would be as follows: Permits and fees; Site work; Utility connections; Excavation; Footings; Foundation; Waterproofing; Backfill; Floor framing; . . . etc. All houses will have a floor. But not all floors will be the same size or type or take the same amount of time to construct. The proportioned duration time will reflect the calculated total from the information contained in the chosen historical data Block, and determine the space allotted to the activity on the time scaled network. If a basement was required, the schedule would have to be adjusted to accommodate the work between Backfill and Floor framing. If the task or assembly has not been predefined in the templet, the software will search for a networked solution to locate the basement correctly in the schedule. If no solution is found then the estimator is prompted to update a templet map to define the interrelationship links. Every similar project (e.g. a house) will have basically the same sequence of events, the differences will be in the amount of time each event duration requires, and the link placement to the juxtaposed activities. A portion of a network map may be directly tied to larger assemblies. This tie will further facilitate the speed and accuracy of the estimating process, by supplying the estimator a graphic historical network reference showing the interrelationships with the activities in the assembly and up to the assembly, from the pervious job. This map can contain a tremendous amount of the actual details from the previous job. Using a master templet will define the sequence, the linkage, and then allow the event durations calculated in the estimating of the tasks to be placed automatically. The schedule can then cascade across the templet adjusting the start, finish, float, resource leveling, etc. in the process.

Good management requires delegation of responsibility to the lowest competent level. Man hour goals are the lowest common denominator that can be delegated to the lowest competent level. Challenging employees to beat the clock with a definite target, coupled to a reward for reaching that target successfully, will increase the efficiency and accuracy of the entire process. Man hour goals can be directly calculated from the schedule times, and assigned to individual employees.

Overhead on employees wages can be reduced by capturing the correct category of work. Some Insurance premiums are based on the amount of work in specific categories or total payroll. These categories are billed monthly at different percentage rates. Without a specific work segregation system the insurance will charge the higher rate for all categories. With the specific unit duration times, the system can calculate the optimum insurance burden for all the work completed that month, prepare the payroll reports for the insurance companies, and print the checks.

Government contract work requires task segregation on certified payroll reports. With the segregated duration times, information needed to prepare certified payroll reports is directly available.

Detail specifications can be attached to historical data Blocks so the contract can automatically be detailed to specify exactly what items have been bid. A separate job or crew information file can contain notes, equipment and tools needed to efficiently complete the activity.

Other objects, features and advantages will occur to those skilled in the art from the consideration of the ensuing description and drawings.

DETAILED DESCRIPTION OF THE PREFERRED EMBODIMENT

The information Building Blocks are similar to the Object Oriented Programming premise, where detailed code modules, plug together in a variety of ways, to produce a functional and reliable structure, quickly. The simplicity of choosing the correct Block is facilitated through actual pictures stored in and linked to historical text, which supersede information conveyed by a general image and text. With the increase in estimating accuracy, duration times and schedules can be simply and reliably generated during the estimating process. Using a predefined network templet, or master map, to place the tasks in the correct network sequence. Directly associated to the units chosen in the estimate, duration time distances on the schedule will be scaled to conform during the creation of the schedule.

Figure 1:
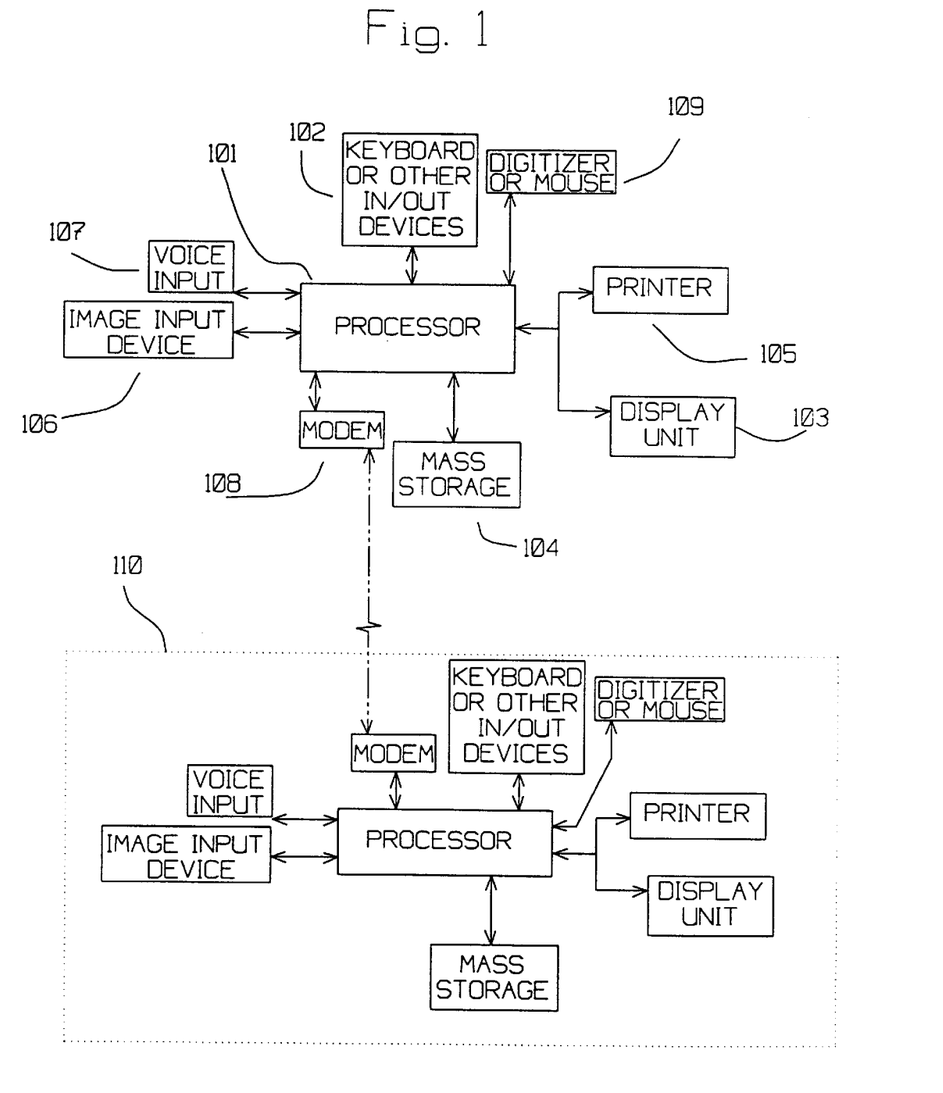
FIG. 1 is a schematic block diagram of a computer system which may be used to implement the programs of FIG. 2.

Referring to FIG. 1, the estimating hardware system, a computer, basically comprising a processor 101 to interpret and execute instructions, to send and receive data to all the peripheral devices. A keyboard or other input devices 102 are used for entering and requesting data from the processor 101. A display unit 103 is used as the main output device to view the information. An image input device 106 is used for capturing a picture or information from the completed work or document. A mass storage device 104 is used to store and retrieve data. A printer 105 is used as another output device to produce tangible copies of the requested data. A modem 108 is used as an input/output device to communicate data with job sites and other locations, as represented by remote computer 110. A voice input device 107 is used to collect job notes, information, or to request data. A digitizer or mouse input device 109 is used to input scaled lengths from scaled plans, items, draw graphics, or navigate the software, during the management process.

Figure 2:
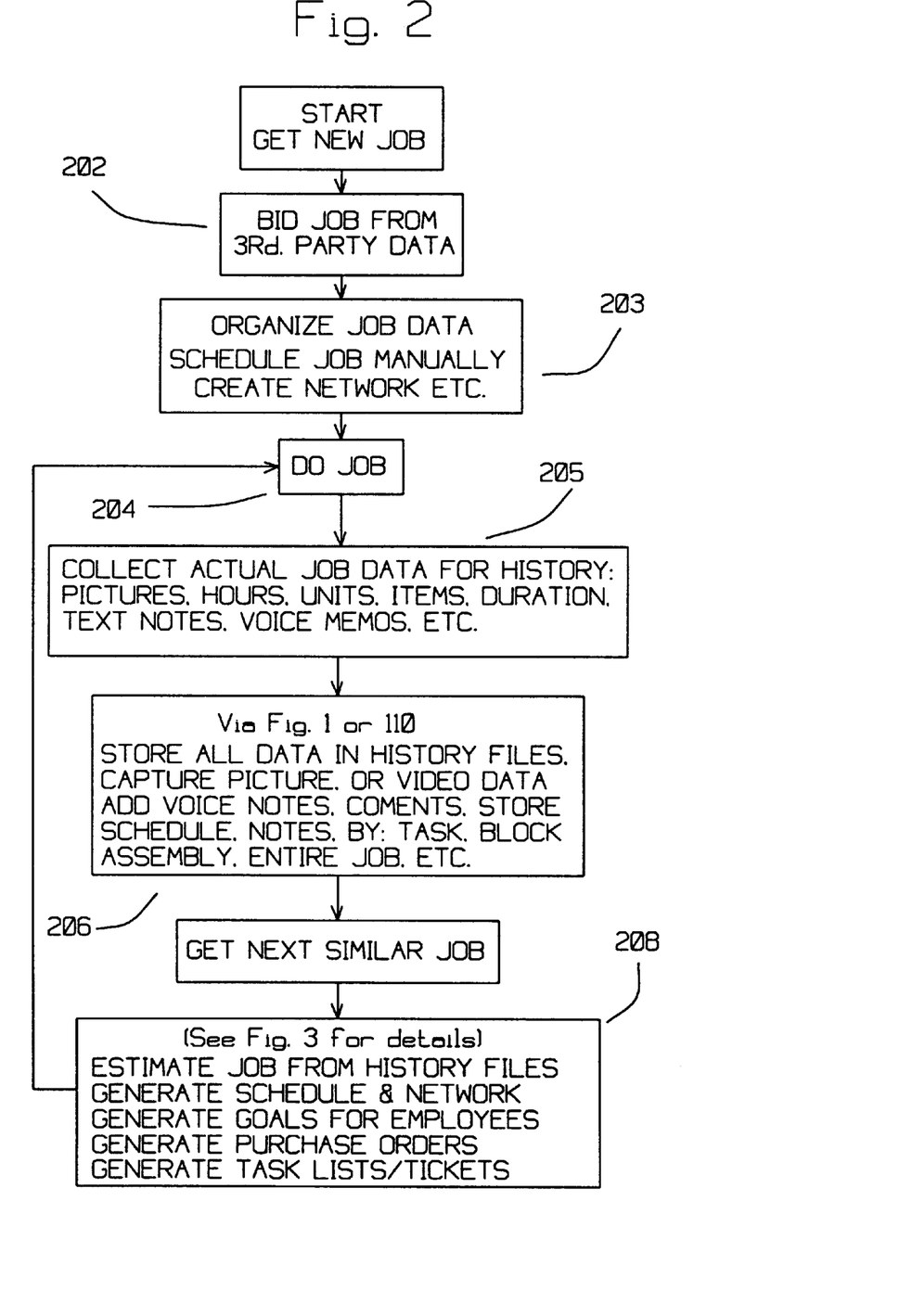
FIG. 2 is a generalized schematic diagram for the process path.

FIG. 2 shows the estimating cycle/process. The estimating process begins at 202 by identifying items and tasks required to complete a project. Beginning with the first task/item needed, and progressing in sequence to the last task/item needed, pricing the items and tasks, adding direct costs, overhead and profit, to produce a total cost and total time required to complete the project. Once these totals have been established, from the 3rd party data, a bid or estimate specifying the work to be completed stating the total cost and total time required to complete the job is prepared and delivered to the requesting authority. If the bid is accepted, the next step 203, is general organization of the compiled job information, preparing a schedule, purchase orders, etc. Commence the project 204. During the course of the work, specific items must be accomplished to complete the project. These items must be monitored to ensure the job stays on track. If these items are organized into Blocks that capture specific details 205, such as man hours, units placed, material used, and that detail is effectively recorded 206 during the course of the project, with pictures, text, voice notes, and other defining records. The historical information gathered and stored in the mass storage device 104, will be an irreplaceable asset of information Blocks (herein called Historical Data Blocks) that will remain a stable reliable judgment base for many years, and can be used in 208, to project the future time, cost, and details of similar Blocks/jobs very quickly and accurately.

Figure 3:
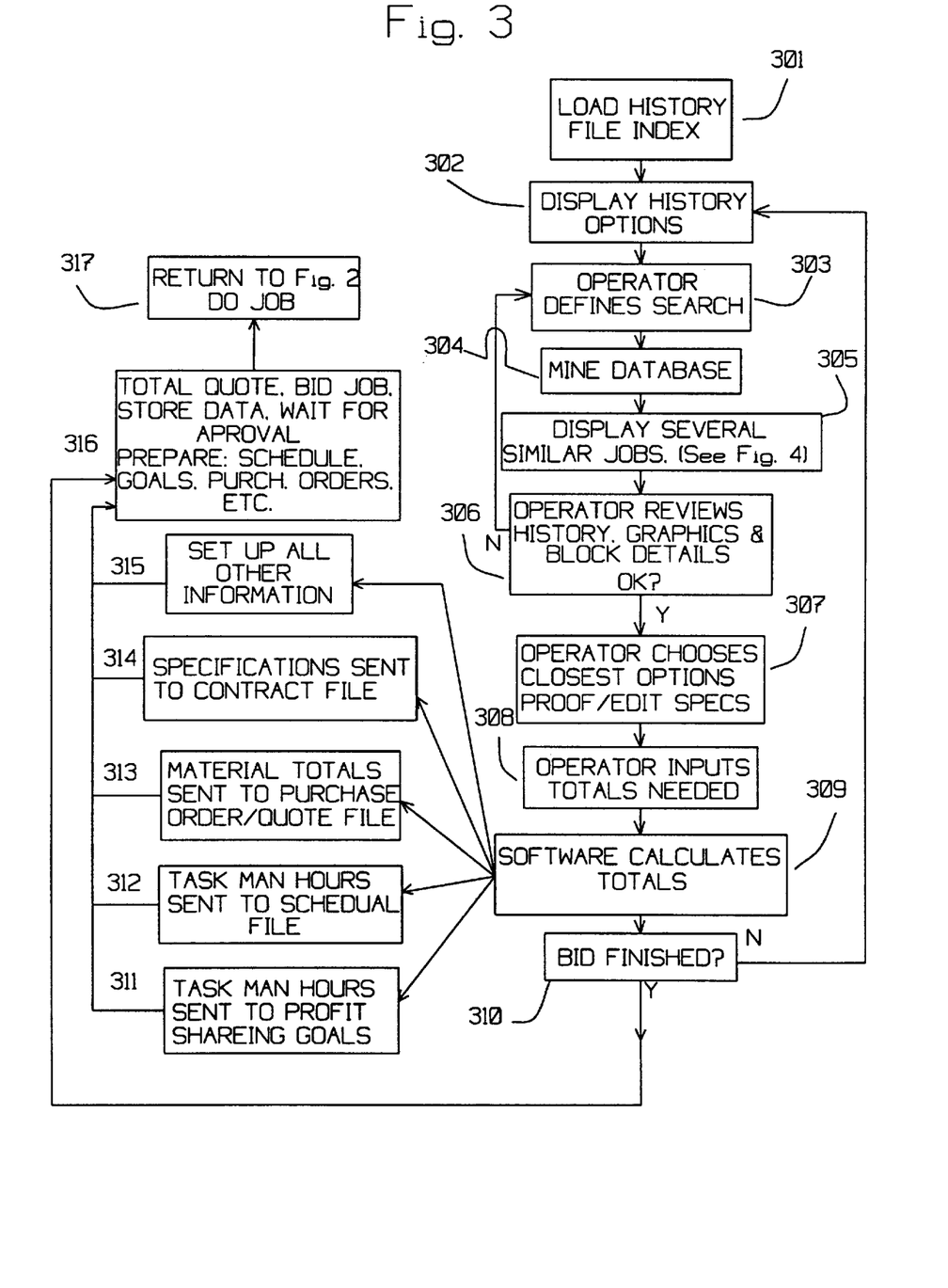
FIG. 3 is a sub set of FIG. 2, detailing the historical estimating process.

FIG. 3 shows the details of historical information based estimating in accordance with the present invention. At step 301 the operator requests historical information from the mass storage 104, by typing the request on the keyboard 102 for the historical cross reference index file 504 (see FIG. 5). At step 302 options or instructions are displayed on the display unit 103, requesting a definition of the search parameters. The operator may know of a similar job, so they would request that historical information specifically. Even if the operator had no knowledge of previous jobs, they would define the category of work (step 303), they needed to estimate, through the keyboard 102. (e.g. Partitioned Offices, 500 square feet; or Walls Commercial Interior ) The processor 101 would browse (step 304) the history file database 504 (see FIG. 5) to locate the desired cross reference links to the condition set in 303 and, display the results (step 305) (See FIG. 4), on the display unit 103. The operator could then review options of the previous jobs or Blocks (step 306), from the picture database 506, in still pictures, moving pictures, or a time lapsed man hours noted series of pictures, linked with the job details and text for reference. Selecting one of the screen buttons 405-1 through 405-4, with a mouse/digitizer button 109 choosing from the options presented (each comprising a Historical Data Block) the closest to the present needs. If the options were not satisfactory, the operator could select screen button 406, with a mouse/digitizer button 109 for more options found, or refine the search parameters by returning to step 303, to locate a closer match. At step 307, when the option match is satisfactory to the estimator and the specifications have been proofread/edited, The operator then inputs (step 308) through the keyboard 102 the option(s) selected, and the number of units or items required, for the new job, in screen field 401. The software would then calculate (step 309) the total materials, hours, and cost needed to complete the number of units requested in step 308, screen field 401, and execute steps 311, 312, 314. The cost of the material items, and the man hours would be calculated in work area 505 by accessing the current material cost database 501, multiplying the cost by the materials needed, storing it in step 313. Then accessing the current cost of labor database 502, multiplying the cost by the hours needed, storing it and any other cost data in step 315. If there were more items that need estimating at step 310, the software would reset the program to repeat the steps starting with 302. When the estimate was finished, step 316 adds the costs, prints the bid and stores the information awaiting approval from the requesting source. If the bid is accepted then, the job will proceed 317.

Figure 4:
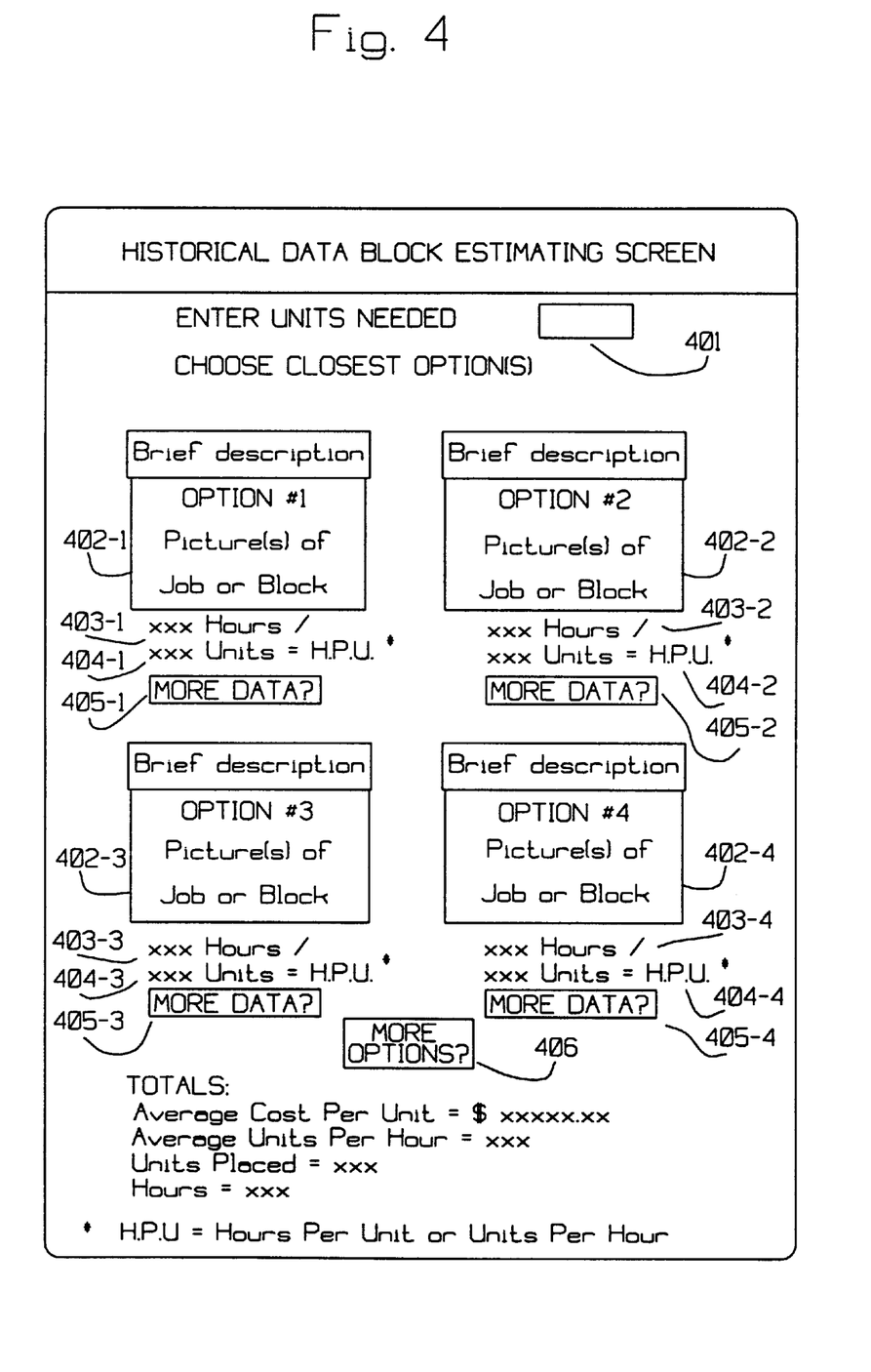
FIG. 4 is an estimating screen and sub set in the flow of FIG. 3 logic, detailing a preferred historical estimating screen.

FIG. 4 shows several different job or block options of essential historical information, displayed on the display unit 103. Screen field 401 is used to enter the total units or items needed for the job being estimated. Screen fields 402-1 through 402-4 (hereafter collectively 402) are used to display multiple options to the estimator for the search defined in 303. Options displayed in fields 402 may be still pictures, moving pictures, a series of pictures, of the job or block, or if no actual picture are available, the actual built working drawings could be transferred into the system. If no pictures were available from 506 at all, then a detailed description of the jobs text may appear in these locations. The screen fields 402 may default to 3rd party information if no other source of historical data is available. Directly below the picture in screen field 402, at 403, are the hours associated with the picture/block 402. At screen location 404 directly below the hours location 403, is the number of units or items placed by the amount of hours in 402. If more information is needed on the option 402, screen button 405 is selected with a mouse/digitizer button 109. The recorded history is then presented to the estimator on display unit 103, to allow the estimator greater inference and control over how close the option(s) are to their needs now.

The user can select one or more of the options shown in the estimating screen of FIG. 4, in which case the system computes averages for the associated duration times and unit costs, and uses those averages as default values for generating cost estimates and job duration estimates.

Figure 5:
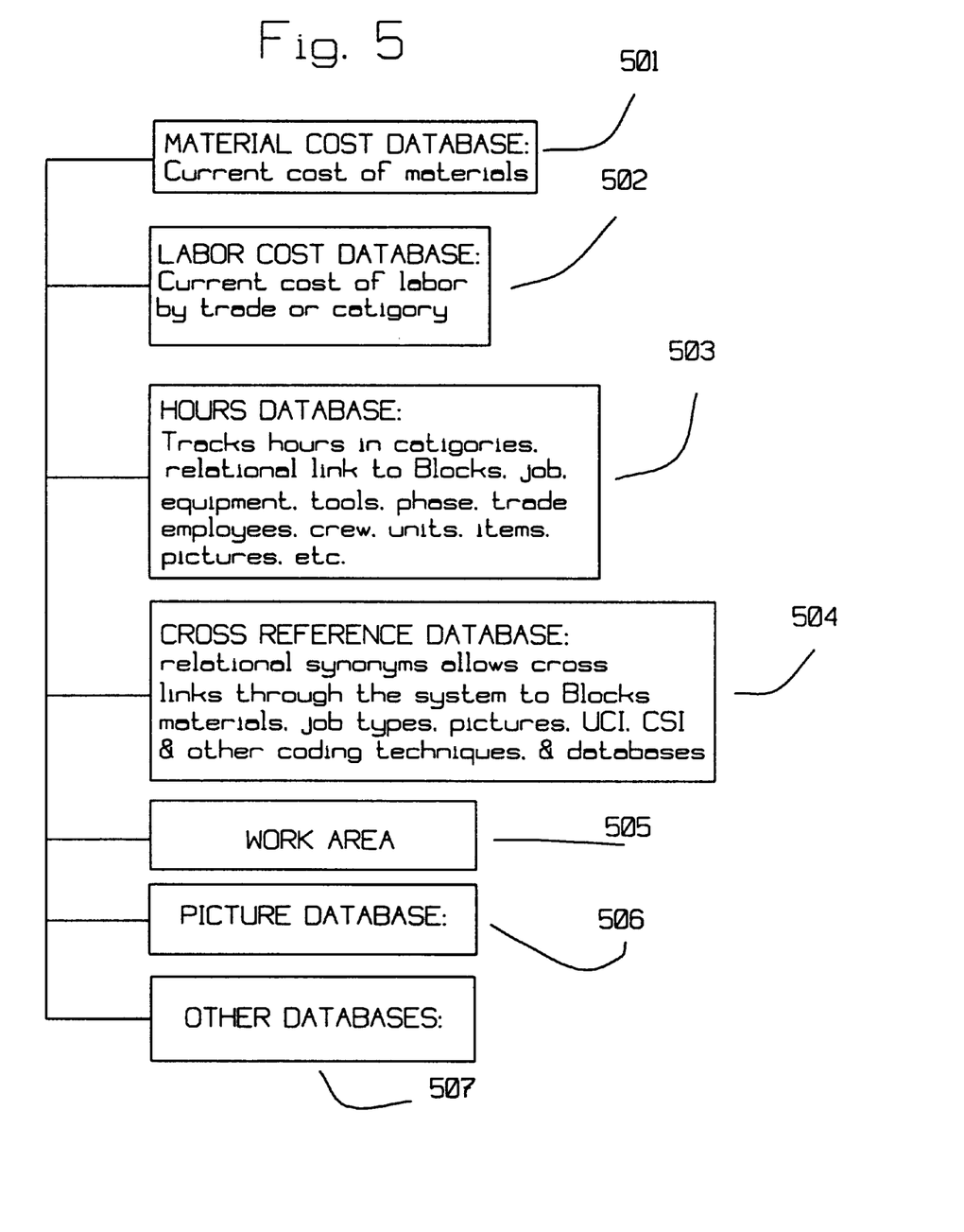
FIG. 5 is an illustration of some needed databases and work area.

FIG. 5 shows some of the related databases and work area in the processors memory or as stored on the mass storage device.

Figure 6A:
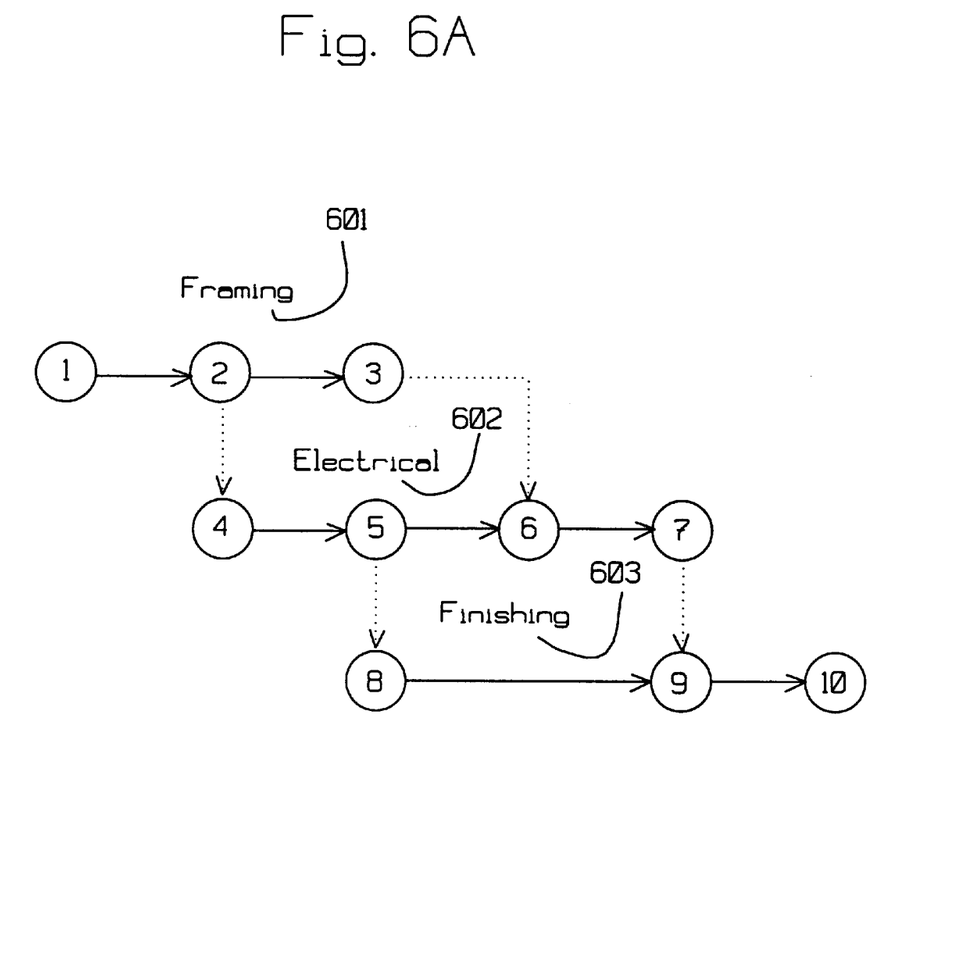
FIG. 6A and 6B are abridged examples of 2 styles of templets.
Figure 6B:
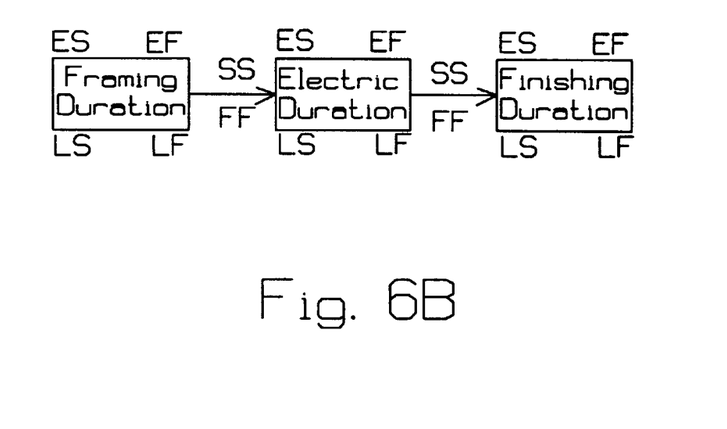

FIG. 6A–B shows 2 standard scheduling styles of templets. FIG. 6A represents an Arrow diagram, while FIG. 6B represents a Precedence diagram. These templets do not show the time scale of the activities lines. However, the templets do retain the name sequence and interdependent network arrow launch and target point link data from the previous job.

In FIG. 6A, framing activity 601 is represented by nodes 1–3 on the scheduling templet, electrical activity 602 is represented by scheduling templet nodes 4–7, finishing activity 603 is represented by scheduling templet nodes 8–10. The display of the scheduling templet to the user shows the named sequence of activities and the dummy activity node links in dotted lines. Newly calculated duration times are placed in the correct activity sequence by name and linked into the network by using a master historical network data map. With the duration times placed in the correct sequence, the time scale of the activity lines lengths can be adjusted to conform. Every similar project (e.g. houses) will have basically the same sequence of events, but details will vary. A house may or may not have a pool and or a basement, etc. These differences will be handled by detailed sub network divisions, bringing forward the correct nodes and linkage to the present map. If no solution is found in the subnetworks detail, then the estimator is prompted to update the templet map to define the interrelationship links. If a zero remains in any of the master activity times after all the times have been placed in the network, the estimator will be prompted to correct the network manually or to command the software to attempt to rework the network. As a guide for the estimator, a portion of a network map may be directly tied to larger assemblies or activities. This tie will further facilitate the speed and accuracy of the process, by supplying the estimator a graphic historical network logic reference showing the interrelationships links with the activities surrounding the subject activity. Once all the activities have been placed with duration times, the software can then optimize the schedule by adjusting the start, finish, float, resource leveling, scale, etc. After viewing the results of the software pass, the estimator may continue to refine the network logic and details.

The scheduling templet in FIG. 6B represents the same schedule as FIG. 6A, but uses a different style of notation that does not depict the subactivities or network links.

From the description above, a number of advantages at the present invention become evident:

(a) It makes estimating simple by presenting several similar options to the estimator. They can simply look at the pictures to determine which historical data is closest to the job being estimated currently. Pictures of actual jobs can convey much more information about a job than just text alone or text with a generic image. Effective pictures linked to facts, encapsulate knowledge that can convey: details, confidence, and accuracy to an estimator that has had little or no prior experience in the area.

(b) Man hours or equipment hours can be a stable Block of information, if effectively refined from the raw data, and formed into reusable Historical Data Blocks. Man hours per Block can be multiplied by the current labor category cost, plus overhead, plus profit to arrive at an accurate current labor cost, even if jobs are many years apart. Man hours per Block can be multiplied by the worker compensation percentage or the liability percentage to obtain the total due the insurance carriers. Man hours per Block can be used to calculate standard payroll, and prepare prevailing wage reports for certified payroll in government contracts. Tracking man hours by Block consolidates the needs to track and calculate these items separately to obtain their totals. The use of Historical Data Blocks containing "man hours per unit of work" information indefinitely extends the time the historical records remain valid. Something built many years ago will still take the same amount of time and the same materials, to build today but these items will not cost the same. Blocks separate the time, and item counts from costs so that the cost can be easily calculated in the future.

(c) Scheduling can be automated when directly linked to stable man hour Blocks. Using a master network templet(s) as a guide to place and link the activities. This will reduce, on most jobs, the manual calculations, the manual construction of a network, and the manual entry of the information by the estimator so that scheduling can be practical for any size job no matter how small. Running the job with a schedule and goals for employees increases the efficiency and therefore the accuracy of the entire process.

(d) The invention reduces the overhead required to capture, organize, store, find, and retrieve the historical information. This increases the accuracy of estimates by facilitating access to the information which will reinforce the estimator's judgment, and reducing the need for third party data references.

(e) The present invention institutes a direct linkage from accurate history units to future units, for accurate estimating, scheduling, and profit sharing, simplifying and streamlining the entire management process.

An Explanation of How the Invention Works or Operates

A preferred embodiment of the invention provides a simple organization of information retrieved and presented to the user, giving the estimator (i.e., user) a superior basis for judgment, by organization of all the task data involved, into Blocks.

Initially the process begins with the collection of information Blocks from an actual job. These Blocks can be as small as necessary, or added together to be as large as necessary, (e.g. the lineal footage and time required to finish, cut, and place a specific style of base board, to the construction of the entire building). The Blocks can be defined before the job begins, so there are no gaps in the sequence. The defined start and stop block points give the crew points to capture, but extemporaneous Blocks can be monitored and captured also. Capturing the information during the course of the entire project about the finished tasks with as much detail as possible, such as a picture stored in 506, voice notes, text notes, etc. stored in other databases 507. This information is entered through the image input device 106, and or the voice input 107, and or the keyboard 102, stored in the mass storage device 104. Eventually many similar jobs will be stored on the mass storage device 104 giving the estimator many detailed options from which to analyze and choose the most similar information Block to estimate the current job. FIG. 4 depicts an estimating screen. Many other common estimating screens are available to the estimator.

To prepare a bid the estimator begins at step 301 defining the topic of interest and requesting a search of the databases. The software will first check the cross reference database to determine if any items match exactly the description defined by the operator's key words. If a match(s) is identified the software will retrieve the data and display the results on the display unit 103. If no exact match is identified a synonym database will be checked to identify a valid cross reference and display the results on the display unit 103. If the results displayed are not satisfactory to the estimator (step 306), they can continue to redefine the search parameters and try again until a match is found. When a match is found (step 307), the portion of the information needed is identified by the operator. The selected information is gleaned by the software and transferred to a history unit calculation area. The estimator determines the number of items/units needed (step 308), entering the total in screen area 401. The software then performs the required calculations on the number in screen area 401 with the number stored in the history unit calculation area, to produce the activity duration total and material quantity total.

The current cost of materials needed are calculated by multiplying materials quantities obtained from the history unit by the current material costs obtained from the material cost database 501. The current cost of labor needed per unit is calculated by multiplying the hour quantities obtained from the history unit by the current cost per man hour obtained from the labor cost database 502. Overhead costs from current figures are then added to the calculation.

Profit markup will default to a current figure or allow the operator to adjust the default before calculating the total current cost. Then a total current cost estimate is computed from the previously computed cost and profit values:
Total Current Cost=Current Labor,+Current Materials+Current Overhead and Profit+Other Direct Costs.

The calculated activity times are transferred to the selected master network templet file for distribution to the correct location on the network. If the software cannot determine the location and links into the network, the estimator is prompted to manually adjust the network to locate the activity in the correct sequence with links. Once all the duration times have been calculated, adjusted if necessary by the estimator, and placed in correct sequence on the network. The software can then proceed with other common optimization procedures such as: A. R. Burgess's, Leveling Procedure; J. D. Weist's, SPAR-1; or other more advanced procedures to produce the most advantageous network, resources allocation, and prepare a scaled graphic representation of the network.

Conclusions, Discussion of Ramifications

The present invention makes estimating and scheduling simple, by refining the raw data into reusable Blocks.

The present invention minimizes one of the largest universal risks in industry: duration misjudgment, by reducing the effort needed to obtain a solid basis for judgment, thus permitting the automation of estimating, scheduling, and profit sharing. (Paddles to power steering.)

The present invention eliminates the confusion associated with determining duration times for labor costing. One of the fastest ways to loose money on a job is to allow too little time to complete the work. It eliminates the confusion associated with determining duration times for scheduling. It reduces the tedious job of manually scheduling every activity and creating complex networks for every project. It even fosters competition by supplying feed back to the estimator, so they can improve on their last estimate, and reduces the need for 3rd party data, producing a truly competitive estimate. It also gives the employees goals to shoot for, fostering a competitive passion with the crews to beat the duration goals set, further increasing efficiency.

The present invention enhances and maintains the knowledge basis of the estimator, by supplying solid reference information Blocks, for a judgment base. The present invention furthermore simplifies the management process by allowing direct transfer of data to other parts of the management system so data can be easily extracted and automatically applied to estimating, scheduling, goal setting, profit sharing, specifications writing, job costing, etc. Pictures stored in cross referenced categories and accessed instantly by computer, make this an invaluable time reference tool. The present invention reduces the overhead costs by categorizing labor so insurance rates can be accurately calculated.

Although the description above contains many specificities, these should not be construed as limiting the scope of the invention but as merely providing illustrations of some of the presently preferred embodiments of this invention. For example, the objects described such as pictures, scheduling, goal setting can be autonomous functions or each eliminated, but they all add something to the process creating a synergistic solution. Thus the scope of the invention should be determined by the appended claims and their legal equivalents, rather than by the examples given.

What is claimed:

1. A computer system for assisting in construction project cost estimating, comprising:
   a historical construction job database that stores historical construction job data including, for a plurality of previously completed construction jobs and construction job portions, factual labor time quantity data, and factual project pictures;
   a user interface for entering project definition parameters that define portions of a user specified project for which a cost estimate is needed, and for displaying images, the displayed images including pictures of previously completed construction jobs and construction job portions for which factual labor time quantity data is stored in the historical construction database; and
   project estimation means, including
      best historical construction job selection means for presenting on the user interface project pictures from the historical construction job database for ones of the previously completed construction jobs and job portions consistent with the project definition parameters entered by the user and for prompting the user to select one or more of the previously completed construction jobs and job portions that are most consistent with the user specified project based on a comparison by the user of the presented project pictures with what the user expects the user specified project to look like; and
   estimate computation means for retrieving the factual labor time quantity data in the historical construction job database for the one or more user selected previously completed construction jobs and computing an initial job cost estimate and an initial job duration estimate for the user specified project in accordance with the entered project definition parameters and the retrieved factual labor time quantity data in the historical construction job database for the one or more user selected previously completed construction jobs, wherein when the user selects more than one previously completed construction job, the estimate computation means combines the retrieved factual labor time quantity data for the user selected construction jobs to generate average labor time quantity data for use when computing the initial job cost estimate and initial job duration estimate.

2. The system according to claim 1 wherein
   the estimate computation means computes averages, including the average labor time quantity data, from the data in the historical construction job database for the user selected previously completed construction jobs, and uses the computed averages as default values for generating cost estimates and job duration estimates; and
   the project estimation means includes control means for enabling the user to adjust the default values so as to generate modified job cost estimates and job duration estimates for the user specified project.

3. The system according to claim 1 wherein the project estimation means includes means for automatically developing a project schedule based on the generated job duration estimates.

4. The system according to claim 1 wherein the project estimation means includes means for automating development of hour related insurance premiums.

5. The system according to claim 1 wherein the project estimation means includes means for automating development of hour related government contract certified payroll and reports.

6. The system according to claim 1 wherein the project estimation means includes means for automating development of goals related to profit sharing.

7. A method of estimating construction project costs, comprising the steps of:
   accessing a historical construction job database that stores construction job data including, for a plurality of previously completed construction jobs and construction job portions, factual labor time quantity data, and factual project pictures;
   entering project definition parameters that define portions of a user specified project for which a cost estimate is needed, and displaying images, the displayed images including pictures of previously completed construction jobs and construction job portions for which factual labor time quantity data is stored in the historical construction database;
   presenting to the user project pictures from the historical construction job database for ones of the previously completed construction jobs and job portions consistent with the project definition parameters entered by the user;
   prompting the user to select one or more of the previously completed construction jobs and job portions that are most consistent with the user specified project based on a comparison by the user of the presented project pictures with what the user expects the user specified project to look like; and retrieving the factual labor time quantity data in the historical construction job database for the one or more user selected previously completed construction jobs and computing an initial job cost estimate and an initial job duration estimate for the user specified project in accordance with the entered project definition parameters and the retrieved factual labor time quantity data in the historical construction job database for the one or more user selected previously completed construction jobs and presenting the initial job duration estimate to the user; wherein when the user selects more than one previously completed construction job, the estimate computing step combines the retrieved factual labor time quantity data for the user selected construction jobs to generate average labor time quantity data for use when computing the initial job cost estimate and initial job duration estimate.

8. The method of claim 7, including:

computing averages, including the average labor time quantity data, from the data in the historical construction job database for the user selected previously completed construction jobs;

generating cost estimates and job duration estimates using the computed averages as default values; and enabling the user to adjust the default values so as to generate modified job cost estimates and job duration estimates for the user specified project.

9. The method of claim 7, including automatically developing a project schedule based on the generated job duration estimates.

10. The method of claim 7, including automatically developing hour related insurance premiums for the user specified project.

11. The method of claim 7, including automatically developing hour related government contract certified payroll and reports for the user specified project.

12. The method of claim 7, including automatically developing goals related to profit sharing for the user specified project.

13. A computer program product for generating construction job cost and duration estimates, the program product comprising:

a recording medium readable by a computer, comprising a historical construction job database that stores historical construction job data including, for a plurality of previously completed construction jobs and construction job portions, factual labor time quantity data, and factual project pictures;

best historical construction job selection means for presenting on a user interface project pictures from the historical construction job database for ones of the previously completed construction jobs and job portions consistent with the project definition parameters entered by a user via the user interface, and for prompting the user to select one or more of the previously completed construction jobs and job portions that are most consistent with the user specified project based on a comparison by the user of the presented project pictures with what the user expects the user specified project to look like; and estimate computation means for retrieving the factual labor time quantity data in the historical construction job database for the one or more user selected previously completed construction jobs and computing an initial job cost estimate and an initial job duration estimate for the user specified project in accordance with the entered project definition parameters and the factual labor time quantity data in the historical construction job database for the one or more user selected previously completed construction jobs; wherein when the user selects more than one previously completed construction job, the estimate computation means combines the retrieved factual labor time quantity data for the user selected construction jobs to generate average labor time quantity data for use when computing the initial job cost estimate and initial job duration estimate.

14. The computer program product of claim 13, including:

means for computing averages, including the average labor time quantity data, from the data in the historical construction job database for the user selected previously completed construction jobs;

means for generating cost estimates and job duration estimates using the computed averages as default values; and means for enabling the user to adjust the default values so as to generate modified job cost estimates and job duration estimates for the user specified project.

15. The computer program product of claim 13, including means for automatically developing a project schedule based on the generated job duration estimates.

16. The computer program product of claim 13, including means for automatically developing hour related insurance premiums for the user specified project.

17. The computer program product of claim 13, including means for automatically developing hour related government contract certified payroll and reports for the user specified project.

18. The computer program product of claim 13, including means for automatically developing goals related to profit sharing for the user specified project.

* * * * *